US010616238B2

(12) United States Patent
Cretella et al.

(10) Patent No.: US 10,616,238 B2
(45) Date of Patent: Apr. 7, 2020

(54) SHARING FILES BASED ON RECIPIENT-LOCATION CRITERIA (71) Applicant: Dropbox, Inc., San Francisco, CA (US)

(72) Inventors: Sean Cretella, San Francisco, CA (US); Paul Ruan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/980,825

(22) Filed: Dec. 28, 2015

(65) Prior Publication Data
US 2017/0187720 A1    Jun. 29, 2017

(51) Int. Cl.
*G06F 7/04* (2006.01)
*H04L 29/06* (2006.01)
*H04L 29/08* (2006.01)
*H04W 4/029* (2018.01)
*H04W 12/08* (2009.01)

(52) U.S. Cl.
CPC .......... *H04L 63/107* (2013.01); *H04L 67/06* (2013.01); *H04L 67/28* (2013.01); *H04W 4/029* (2018.02); *H04W 12/08* (2013.01)

(58) Field of Classification Search
CPC .............................. H04L 63/107; H04L 67/06
USPC ...................................................... 726/26–30
See application file for complete search history.

(56) References Cited

U.S. PATENT DOCUMENTS

| 8,613,108 | B1* | 12/2013 | Aggarwal | H04L 63/101 |
| | | | | 455/411 |
| 2007/0118910 | A1* | 5/2007 | Taylor | G06F 21/10 |
| | | | | 726/27 |
| 2007/0266446 | A1* | 11/2007 | Aaron | G06F 21/10 |
| | | | | 726/30 |
| 2008/0052783 | A1* | 2/2008 | Levy | G06F 17/30067 |
| | | | | 726/26 |
| 2011/0137437 | A1* | 6/2011 | Jonsson | G01C 21/20 |
| | | | | 700/94 |

(Continued)

OTHER PUBLICATIONS

Shen, Haiying, "EAD: An Efficient and Adaptive Decentralized File Replication Algorithm in P2P File Sharing Systems," 2008 Eighth International Conference on Peer-to-Peer Computing Year: 2008 pp. 99-108.*

(Continued)

*Primary Examiner* — Roderick Tolentino
(74) *Attorney, Agent, or Firm* — Hickman Palermo Becker Bingham LLP (57) ABSTRACT Techniques are provided for enabling server-based file sharing that supports recipient-location criteria. Specifically, users that desire to share files are able to include recipient-location criteria in the sharing criteria for the files that the users provide for sharing. Before sharing a file that is associated with recipient-location criteria, the file sharing server determines whether the current location of the recipient device satisfies the recipient-location criteria associated with the file. If the current location of the device does not satisfy the recipient-location criteria associated with the file, then the file is not shared with the given device even if all other sharing criteria for the file is satisfied. On the other hand, if the current location of the recipient device satisfies the recipient-location criteria associated with the file, and all other sharing criteria of the file are satisfied, then the file is shared with the given device.

20 Claims, 4 Drawing Sheets (56) References Cited

U.S. PATENT DOCUMENTS

| | | | |
|---|---|---|---|
| 2012/0159156 A1* | 6/2012 | Barham | G06F 21/6218 |
| | | | 713/156 |
| 2014/0245393 A1* | 8/2014 | Worrall | H04L 63/107 |
| | | | 726/4 |
| 2014/0248912 A1* | 9/2014 | Snider | H04W 4/021 |
| | | | 455/456.3 |
| 2014/0283145 A1* | 9/2014 | Chebiyyam | H04L 63/0245 |
| | | | 726/30 |
| 2014/0337993 A1* | 11/2014 | Winters | H04N 1/00137 |
| | | | 726/26 |
| 2015/0058749 A1* | 2/2015 | Hwu | H04L 67/18 |
| | | | 715/753 |
| 2015/0120362 A1* | 4/2015 | Whorley, Jr. | G06Q 50/205 |
| | | | 705/7.19 |
| 2015/0135300 A1* | 5/2015 | Ford | H04L 67/1097 |
| | | | 726/11 |
| 2015/0143530 A1* | 5/2015 | Lee | G06F 21/16 |
| | | | 726/26 |
| 2015/0154614 A1* | 6/2015 | Sullivan | G06Q 30/0201 |
| | | | 705/7.29 |

OTHER PUBLICATIONS

Abiona et al., "Architectural model for Wireless Peer-to-Peer (WP2P) file sharing for ubiquitous mobile devices," 2009 IEEE International Conference on Electro/Information Technology Year: 2009 pp. 35-39.*

* cited by examiner

SHARING FILES BASED ON RECIPIENT-LOCATION CRITERIA

FIELD OF THE INVENTION

The present invention relates to file sharing and, more specifically, sharing files based on recipient-location criteria.

BACKGROUND

People have been sharing electronic files for nearly as long as computing devices have existed. Initially, sharing files meant physically transporting some storage media, such as a floppy disk or a stack of punch cards, from one location to another. More recently, sharing files is typically performed by sending files over digital networks, without requiring movement of any physical objects. For example, a file can be sent directly from one device to another over a network to which both devices are connected.

Figure 1:
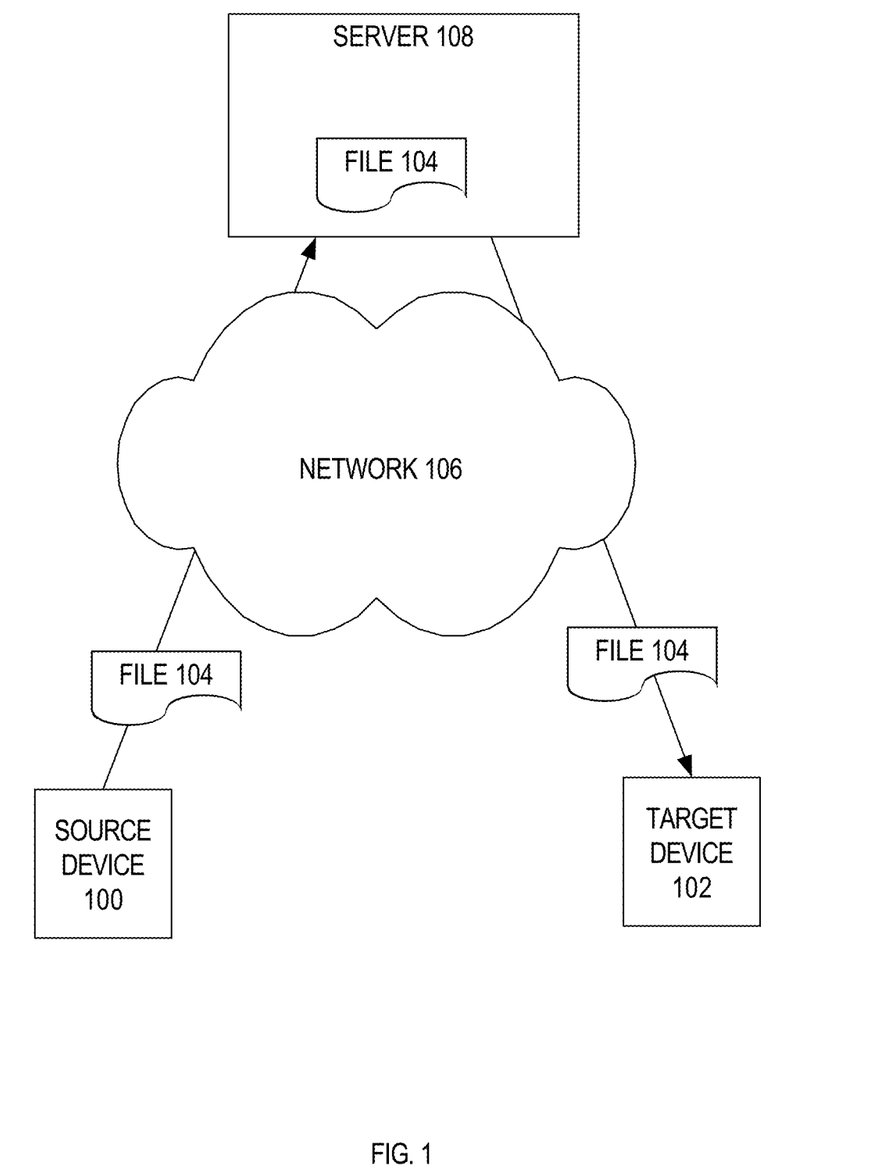
FIG. 1 is a block diagram of a server-based file sharing system.

Sending a file directly from one device to another has the drawback that both devices typically have to be connected to the network at the same time. With the proliferation of mobile devices that do not maintain constant network connections, server-based file sharing has become popular. FIG. 1 is a block diagram of a conventional server-based file sharing system. Referring to FIG. 1, the owner of a source device 100 wants to share a file 104 with the owner of a target device 102. The source device 100 connects to a network 106 and uploads the file to a server 108. When the target device 102 connects to the network 106, the server 108 determines whether server 108 has any files for target device 102 to download. In the present example, server 108 determines that file 104 is available for target device 102 to download. File 104 may then be automatically downloaded to target device 102, or target device 102 may display a control through which the owner of target device 102 may cause file 104 to be downloaded to target device 102.

Typically, every server 108 of a file sharing service handles the file transfers for large numbers of client devices. Therefore, when source device 100 provides the file 104 to server 108, source device 100 will typically also provide "sharing criteria" that specifies with whom the file is to be shared. Conventionally, the sharing criteria identifies a user or user group with whom the file 104 is to be shared. In the example illustrated in FIG. 1, the sharing criteria for file 104 may indicate the owner of target device 102, or a user group to which the owner of target device 102 belongs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for enabling server-based file sharing that supports recipient-location criteria. Specifically, users that desire to share files are able to include recipient-location criteria in the sharing criteria for the files that the users provide for sharing. Before sharing any file that is associated with recipient-location criteria, the file sharing server determines whether the current location of the recipient device satisfies the recipient-location criteria associated with the file. If the current location of the recipient device does not satisfy the recipient-location criteria associated with the file, then the file is not shared with the recipient device even if all other sharing criteria for the file is satisfied. On the other hand, if the current location of the recipient device satisfies the recipient-location criteria associated with the file, and all other sharing criteria of the file are satisfied, then the file is shared with the given device.

System Overview

Figure 2:
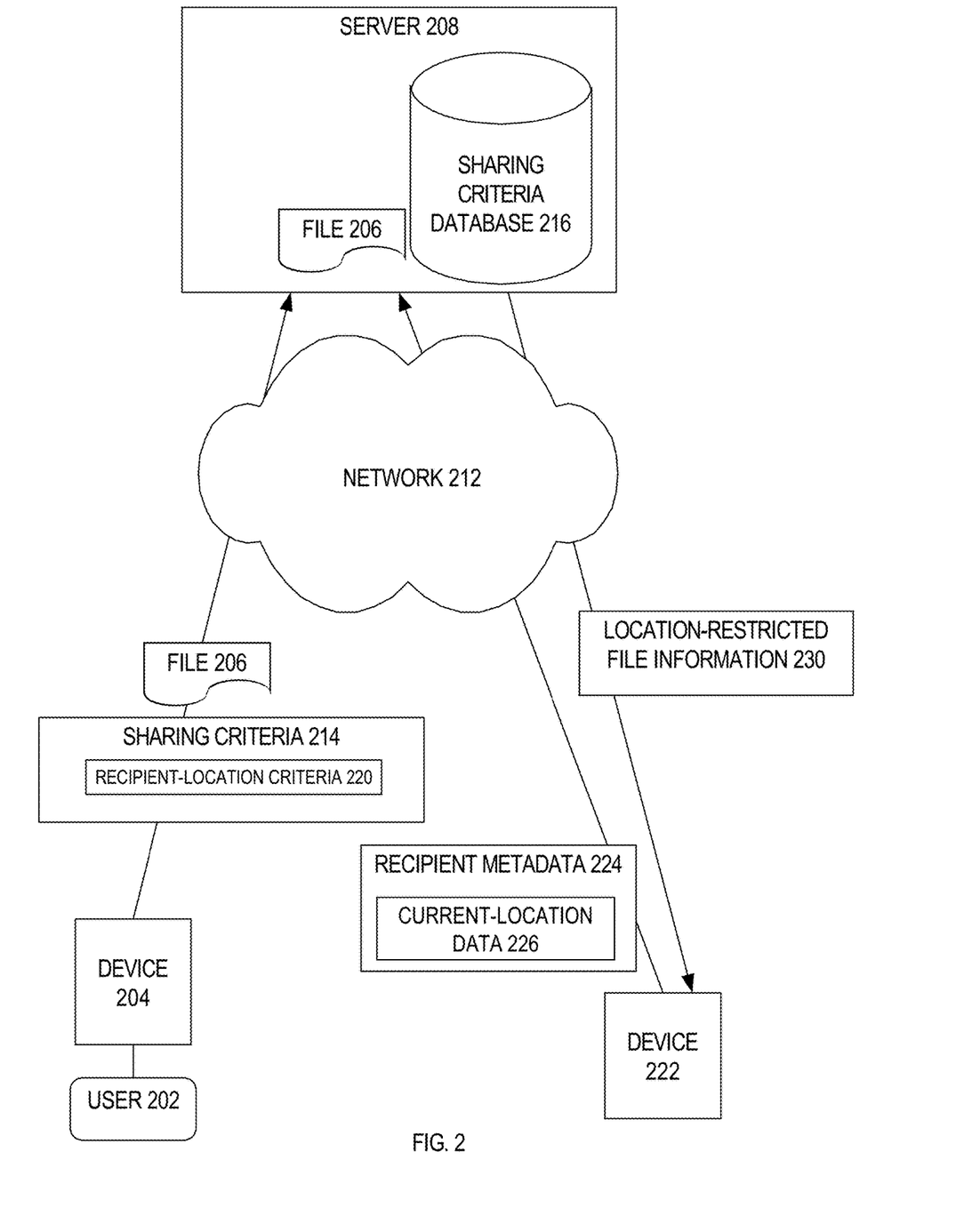
FIG. 2 is a block diagram of a server-based file sharing system that has been enhanced to support file sharing based on recipient-location criteria, according to an embodiment.

FIG. 2 is a block diagram of a system that employs server-based file sharing with recipient-location criteria, according to an embodiment. Referring to FIG. 2, a user 202 of a device 204 wishes to share a file 206 with everyone that attends a particular conference. Assume that the particular conference is to be held on Jan. 1, 2016 in a building located at location X. Under these circumstances, user 202 may cause device 204 to upload file 206 to server 208 over a network 212. In addition to file 206, device 204 provides the sharing criteria 214 to server 210.

Unlike conventional server-based file sharing, the sharing criteria 214 associated with file 206 includes recipient-location criteria 220. Recipient-location criteria 220 specifies where a device has to be located, geographically, to qualify for access to the corresponding file 206.

In the present example, the sharing criteria 214 for file 206 may be:
availability date: Jan. 1, 2016
target location: location X
radius (maximum distance from target location): 100 yards.

Significantly, in this example, there is no specific target user or user group specified. Thus, file 206 will be accessible to anybody that is in the right place (within 100 yards of location X) at the right time (on Jan. 1, 2016).

Server 210 may store sharing criteria 214, in association with file 206, in a database 216 of sharing criteria. When devices, such as device 222, connect to network 212, the devices send requests to server 206 for information about available shared files. In response to such requests, server 208 determines the shared files for which the devices are qualified, and sends information about those shared files to the devices. According to one embodiment, server 208 determines the shared files for which a particular device qualifies by comparing recipient-metadata to the sharing criteria in sharing criteria database 216.

For example, when device 222 connects to network 212, device 222 sends recipient-metadata 224 to server 208. Recipient-metadata 224 may include many types of information, including information about device 222, information about the user of device 222, and/or information about the current environment of device 222. In the example illustrated in FIG. 2, the recipient metadata 224 includes, among other things, current-location data 226. Current-location data 226 indicates the current location of device 222. Current-location data 226 may be derived in a variety of ways. For example, device 222 may have a GPS component capable of providing the current location of device 222. As another example, device 222 may derive its location from other sources, such as beacons similar to those described in U.S. Pat. No. 5,642,050, the contents of which is incorporated herein by reference.

Upon receipt of the recipient metadata 224 from device 222, server 208 compares the recipient metadata 224 against the sharing criteria stored in 216. Based on the comparison, server 208 may determine that device 222 is qualified for any number of location-restricted shared files, or for none at all. Accordingly, server 208 sends to device 222 file information 230 for the location-restricted files that device 222 is qualified to see.

In the present example, whether device 222 is qualified to receive information about file 206 is based on the current date, and whether the current-location data 226 indicates a location within 100 yards of location X. If the current date is not Jan. 1, 2016, device 222 is not provided information about file 206. If the current-location data 226 is not within 100 yards of location X, then device 222 is not provided information about file 206. On the other hand, if the current date is Jan. 1, 2016 and the current-location data 226 is within 100 yards of location X, then server 208 provides information about file 206 to device 222 and allows device 222 to access and/or download file 206.

Specifying Recipient-Location Criteria

As mentioned above, a device that is sharing a file using recipient-location criteria communicates that recipient-location criteria to server 208. The recipient-location sharing criteria, as well as all other sharing criteria, may be provided to server 208 with the file to which the criteria pertains. Alternatively, the criteria may be provided before or after the corresponding file has been provided to server 208. For example, a user may pre-establish a policy that all files shared by the user be shared only with recipients located at location X. Having established that policy, when the user identifies a particular file to share, server 208 locates the appropriate policy, and based on that policy assigns the appropriate sharing criteria to the particular file.

Figure 3:
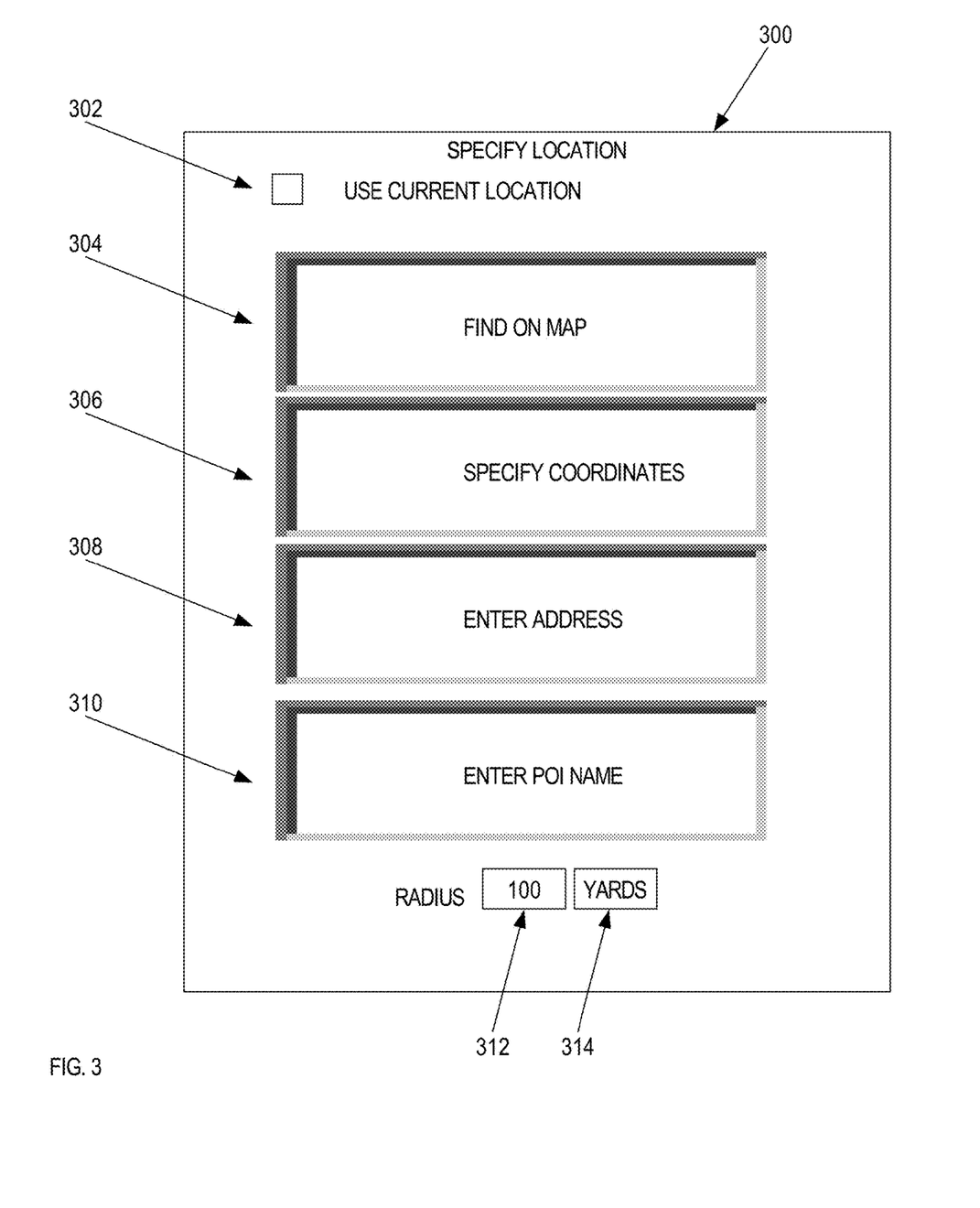
FIG. 3 is a block diagram of an interface that may be used to specify recipient-location criteria, according to an embodiment.

The interface by which users specify recipient-location criteria may also vary from implementation to implementation. For example, the user may be presented with an interface such as that illustrated in FIG. 3. Referring to FIG. 3, a user that intends to share one or more files may be presented with an interface 300 for specifying recipient-location criteria. In the embodiment illustrated in FIG. 3, the recipient-location criteria includes a "target location" and a target radius. Those devices whose distance from the target location does not exceed the target radius are deemed to satisfy the recipient-location criteria. Devices whose current location exceeds that distance from the target location do not satisfy the recipient-location criteria.

Interface 300 includes a checkbox 302 which, when selected, will cause the target location to be the current location of the user. Thus, a user wishing to share a particular file with other users that at that same location would check checkbox 302. When checkbox 302 is checked, the location of the device is determined at the time the user shares a file (for example, based on GPS signals received by the device). That location is then automatically used as the target location in the recipient-location criteria that is associated with the file.

On the other hand, if the user wishes to share the particular file with users at a different location, then the user may select one of buttons 304, 306, 308 and 310. Selection of button 304 causes generation of a map interface (not shown) where a user can scroll, zoom in and out, and ultimately drop a pin on one or more target locations. The target location(s) of recipient-location criteria is established to be the location(s) identified by those pins.

Selection of button 306 provides an interface (not shown) in which a user may explicitly enter geographic coordinates, such as longitude and latitude values or GPS coordinates. Upon entry of the coordinates through that interface, the target location of the recipient-location criteria is established to be the location(s) indicated by those coordinates.

Selection of button 308 allows the user to enter a street address. The street address is then used to locate corresponding geographic coordinates, which are ultimately established as the target location of the recipient-location criteria.

Selection of button 310 causes display of an interface (not shown) for specifying the name of a point of interest. The point of interest name is then used to locate the geographic coordinates, which are ultimately established as the target location for the recipient-location criteria.

Buttons 304-310 are controls for causing display of interfaces for specifying the target location in a variety of ways. However, the techniques described herein are not limited to any particular mechanism for specifying recipient-location criteria. For example, in an alternative embodiment, a user may take or select a photo. The geographic metadata associated with the photo may be used as the target location of the recipient-location criteria of the file. If the photo has no geographic metadata, then the photo may be automatically matched against a population of photos that do have geographic metadata. The geographic metadata of the closest-matching photo may then be used as the target location of the recipient-location criteria.

Fields 312 and 314 are an example of controls that may be used to indicate how close devices have to be to the target location, specified in the recipient-location criteria, in order for those devices to satisfy the recipient-location criteria. For example, the values in fields 312 and 314 indicate that devices must be within 100 yards of the target location. If the value in field 314 were changed to "miles", then devices would only have to be within 100 miles of the target location in order to satisfy the recipient-location criteria.

Obtaining Location-Restricted Files

A file whose sharing criteria includes recipient-location criteria is referred to herein as a "location-restricted file". To obtain a location-restricted file, a device needs to ask for shared files while at a location that satisfies the recipient-location criteria assigned to the files. For example, server 208 may be part of a file sharing service in which some shared files are location-restricted, while others are not. The files that are not location-restricted are shared based on other sharing criteria. For example, user A may share a file with user B by explicitly identifying user B as the person with whom the file is to be shared. Similarly, user A may share a file with user B by explicitly identifying a user group to which user B belongs, as the user group with which the file is to be shared.

The file sharing server may provide an application, executable on a user's device, that generates an interface that allows the user to see shared files. According to one embodiment, the interface has a "shared with you" tab which, when selected, causes display of all files that are not location-restricted that have been explicitly shared with the user. In addition, the interface has a "files near you" tab which, when selected, causes display of all location-restricted files that the user is qualified to access based on the current location of the user's device. For example, referring again to FIG. 2, when the owner of device 222 selects the "files near you" tab, device 222 sends a request to server 208. The request is for location-restricted files that the user is qualified to access based on the current-location data 226 that accompanied the request.

When server 208 receives the request, server 208 compares the current-location data 226 with the recipient-location criteria stored in database 216, and determines the location-restricted files to which the owner of device 222 is qualified to access. Server 208 than "shares" those files with device 222. Sharing a file may involve automatically downloading the file, or merely providing information and/or hyperlinks to the file. The techniques described herein are not limited to any particular manner of "sharing" a file once it has been determined that a user is qualified to access the file.

Example: Conference Handouts

There are numerous practical applications for server-based file sharing based on recipient-location criteria. As one example, briefly mentioned above, recipient-location-specific file sharing may be used to disseminate information at specific events, such as a conference. Currently, it is common for hard copies of materials to be handed out at conferences. Creating hard copies is expensive, wasteful, and more harmful to the environment than electronic distribution of materials.

To avoid the waste and expense of hard copies, some conferences now post URLs to which the attendees can navigate to download conference materials. Unfortunately, it is awkward to enter long URLs in some mobile devices. In addition, posting materials in that manner makes the materials available to anyone, and not just the intended audience. To avoid public exposure of the materials, the materials may be password protected. However, each such protection makes it more inconvenient for the intended audience to obtain the materials.

In contrast, disseminating conference materials through the use of recipient-location-specific file sharing is easy for both the provider of the materials and the intended recipients. The provider need not know the identity of the conference attendees, nor password protect the materials. The provider simply needs to include in the sharing criteria the appropriate recipient-location criteria (i.e. the target location =the location of the conference). The sharing criteria may also include, in this case, the date of the conference. Based on such sharing criteria, the provider effectively limits the dissemination of the materials to the conference attendees.

From the conference attendee perspective, the process of obtaining the materials is also simple. Specifically, once at the conference, the conference attendee simply logs in to the file sharing service to which server 208 belongs. As part of the log-in procedure, the attendee's device sends current-location data 226 to the server 208. Based on the current location data and the current time, server 208 searches database 216 to identify all files whose sharing criteria is satisfied. Those files will include all materials that have been uploaded for the conference. Those files may either be automatically downloaded by the attendee's device, or the device may present the user with the option of downloading the files, viewing the files online, etc. The techniques described herein are not limited to any particular way of providing files to the recipients.

Example: Scavenger Hunt

Another application of recipient-location-specific file sharing is for entertainment. For example, scavenger hunts may be easily implemented using recipient-location-specific file sharing. For example, a scavenger hunt designer may create ten hints, the answer to which is a location in a particular city. The designer may put the first hint in a first document, and then share that document with recipient-location criteria whose target location is the starting point of the scavenger hunt. The designer may then put the second hint in a second document, and then share the second document with recipient-location criteria whose target location is the answer to the first hint. The designer may then put the third hint in a third document, and then share the third document with recipient-location criteria whose target location is the answer to the second hint. This process would continue until a document with the tenth hint has been shared with the target location that is the answer to the ninth hint. Finally, a file that says "you win!" can be shared with the target location that is the answer to the tenth hint.

As mentioned above, the sharing criteria associated with a file may include more than just recipient-location criteria. In the case of a scavenger hunt, it may be desirable to make the documents only available to those playing the scavenger hunt. This may be accomplished, for example, by assigning a password to all documents, and providing the password to the scavenger hunt players. To prevent players from inadvertently discovering documents out of order (e.g. in search of the second location, they discover the ninth hint document because they happen to be in the vicinity of the ninth location), the designer can put the password to each document in the document that immediately precedes it. For example, the password for the second document would be in the first document, and the password to the third document would be in the second document. Thus, even if a player is lucky enough to stumble upon a later document, the player will not be able to access its contents until the player has found all preceding documents.

Example: Schedule Monitoring

Another practical application of recipient-location-specific file sharing is schedule monitoring. Schedule monitoring generally refers to situations where one party wants verification that another party was at certain places at certain times. For example, a parent may want to make sure that their child is attending all of his or her college classes. The parent may share a different file at the target location of each class, with time criteria based on the time of the class. The parent may then, at the end of the day, ask the child about the content of each document.

Alternatively, the documents that are tied to each class may each have a password for the next document. Under these circumstances, the child need only show that he/she has the contents of the last document to prove that the child attended all classes, since the content of the last document would only be available if the child had obtained all preceding documents.

The educational institutions themselves may employ recipient-location-specific file sharing as a means of taking roll. For example, rather than use precious classroom time to determine attendance, students may simply download a file that has been shared with the place and time of the class. The document may contain a URL which, when activated, allows the student to identify himself/herself to a server that tracks the attendance.

To facilitate schedule monitoring, educational institutions may provide, at the time a student's course schedule is finalized, a file that contains all of the geographic information and timing information for the student's classes. The institution may also provide an automated system that uploads the documents, with the appropriate recipient-location criteria, needed to monitor a specific student's attendance. The institution may also provide a portal to which parents may sign on to see their child's specific attendance history.

Monitoring a student's attendance is merely one form of schedule monitoring. As another example, employers may wish to monitor the visits of outside salespeople, truck drivers, or employees involved other forms of delivery. For example, a delivery person may be assigned to deliver items to locations A, B and C. The employer's scheduling computer may automatically share documents at each these locations where the sharing criteria includes recipient-location criteria that target locations A, B and C, and timing criteria based on the delivery schedule. If the delivery person visits locations A, B and C according to schedule, then the delivery person will be able to successfully a corresponding shared file, from the employer, at each of the locations. If the delivery person does not access the files (which may be automatically detected by server 208, or determined by quizzing the delivery person or inspecting the delivery person's device), then the delivery person may receive a warning or a negative evaluation.

Example: Location-Relevant Documents

Another practical application of recipient-location-specific file sharing involves the sharing of location-relevant documents. Location-relevant documents are document that would be particularly interesting to people located at a particular location. For example, a document (or other type of file) that contains information about location X would be particularly relevant to people that are located at location X. In this example, location X may be a historical site, a house for sale, or a particular exhibit in a museum.

With respect to the museum scenario, the museum may prepare a document for each of its exhibits, and then share the document using recipient-location criteria that requires the recipient of each document to be at or near the exhibit that is described in the document.

With respect to the house for sale scenario, when people happen by a house that has a for sale sign, it would be convenient for those people who want to know more to easily download files that provide additional information. This would replace the need of the physical hand-outs that inevitably run out. It also would be more convenient than simply providing a URL, or a QR code. The desired material would be immediately available merely by having a mobile device send a request to the file sharing service. Based on the current-location data that accompanies the request, the fire sharing service would share the appropriate files.

Additional Sharing Criteria

Recipient-location criteria may be used in conjunction with any number of other types of sharing criteria. For example, location-restricted file may also be protected by a password, or may be limited to an explicitly identified user, set of users, or user group. In addition, the sharing criteria may put restrictions on when the file is available, and what rights are given to those that access the file. For example, the sharing criteria for a file may be such that users located at location X may view and edit the file, while users located at location Y may only view the file.

Examples of sharing criteria that may be used in conjunction with recipient-location criteria includes, but is not limited to:
- password protection
- start-sharing date/time and end-sharing date/time
- userid, or user group
- demographic information about the user (e.g age, gender, language, etc.)
- information about the user's device (e.g. device type, screen resolution, operating system, security profile, etc.)
- access rights: view, edit, delete, modify sharing criteria The sharing criteria for any file may be arbitrarily complex, combining various types of factors in a variety of ways. For example, the sharing criteria for a file may indicate that the file may be viewed by anyone (i.e. no location restrictions for viewers), may be edited by females over 30 at location X, and may be edited by anyone in the editorial user group, that is using a mobile phone, and is located at location Y.

Recipient-Side Filtering

It is possible for large numbers of files to have the same target location. For example, a large building may host dozens of conferences in a week, and each of those conferences may have dozens of files that specify the conference building as their target location. Under these circumstances, when a user at the conference building selects "files near me" the user may be presented with information about hundreds of files. Most of those files may not be of interest to the user.

To help file share recipients identify the files in which they are interested, a recipient-side filtering mechanism may be provided. For example, a user may be able to filter the "files near me" by time, or by tags assigned to the files. The tags assigned to files may specify, for example, the conference for which the file is being provided and/or the specific presentation, within the conference, for with the file is being provided. Tags, and therefore filtering options, may also include subject matter, author, etc.

Termination of Sharing

Rather than share location-restricted files indefinitely, the sharing criteria of a file may also indicate an expiration date, after which the file sharing system will cease to share the file. If no expiration date is provided, then the file sharing service may apply a default expiration policy. For example, by default location-restricted files are shared for three months, and then deleted.

Rather than wait for expiration, a mechanism may be provided to allow the users that initially shared a file to delete the file (or otherwise terminate it from being shared based on location). Through the combination of recipient-side filtering, auto-expiration, and express termination of sharing, situations may be avoided where the files being shared at any given site become so numerous as to be unhelpful to users.

Sharing Rights

According to one embodiment, the file sharing service may restrict rights to location-share a file. For example, owners of a museum may have unrestricted rights to share location-restricted files in the vicinity of the museum. Other users, on the other hand, that attempt to share a file where the target-location is the museum have to have their file sharing request approved by the museum owners. Restricting location-based sharing in this manner may help prevent situations where competitors/opponents of an institution bombard the institution's location with location-restricted files containing negative propaganda.

Unlimited Radius

According to one embodiment, a target location for a file may be specified without also specifying a radius. Under these conditions, the radius assigned by the file sharer is considered unlimited. Thus, any device user, no matter where the user is located, is able to see a listing of all unlimited-radius location-restricted files. However, seeing all such files is not necessarily helpful. Therefore, a mechanism is provided to allow users to specify a radius relative to their current location. All unlimited-radius location-restricted files that have target locations that are within the specified radius of a user's current location are visible to the user. In one embodiment, the user will be presented with a list of those files, ordered by distance from the user's current location.

For example, assume that a user is located at location X, and that no location-restricted files have location X as their target location. If the user specifies 100 mile radius, then the user is provided a listing of unlimited-radius location-restricted files that have target locations within 100 miles of location X. Merchants that want to make their brochures available to as many people as possible may use unlimited-radius location-restricted file sharing to do so. On the other hand, file sharers that want to restrict their files to users that are actually at a particular location will typically specify a relatively small radius.

According to one embodiment, unlimited-radius location-restricted files are shared based on a location that need not be the actual location of the recipient. For example, in one embodiment, a user may specify a location on a map. That location may be sent to server 208 to obtain a list of unlimited-radius location-restricted files that are near that specified point. In this manner, a user may, for example, obtain the brochures for all merchants on a particular street without having to actually be on that street. This may be convenient, for example, if the user plans on visiting that street in the near future.

The difference between limited and unlimited radius location-restricted files is in the comparison made to determine whether recipient-location criteria is satisfied. Specifically, according to one embodiment, recipient-location criteria of a limited-radius location-restricted file is satisfied when the current-location of the recipient falls within the area defined by (a) the target location specified by the target sharer, and (b) a radius that is either specified by the file sharer or by the file sharing system. On the other hand, recipient-location criteria of an unlimited-radius location-restricted file is satisfied when the target location specified by the file sharer falls within the area defined by (a) either the current location of the recipient or a location specified by the recipient, and (b) a radius that is either specified by the recipient or by the file sharing system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
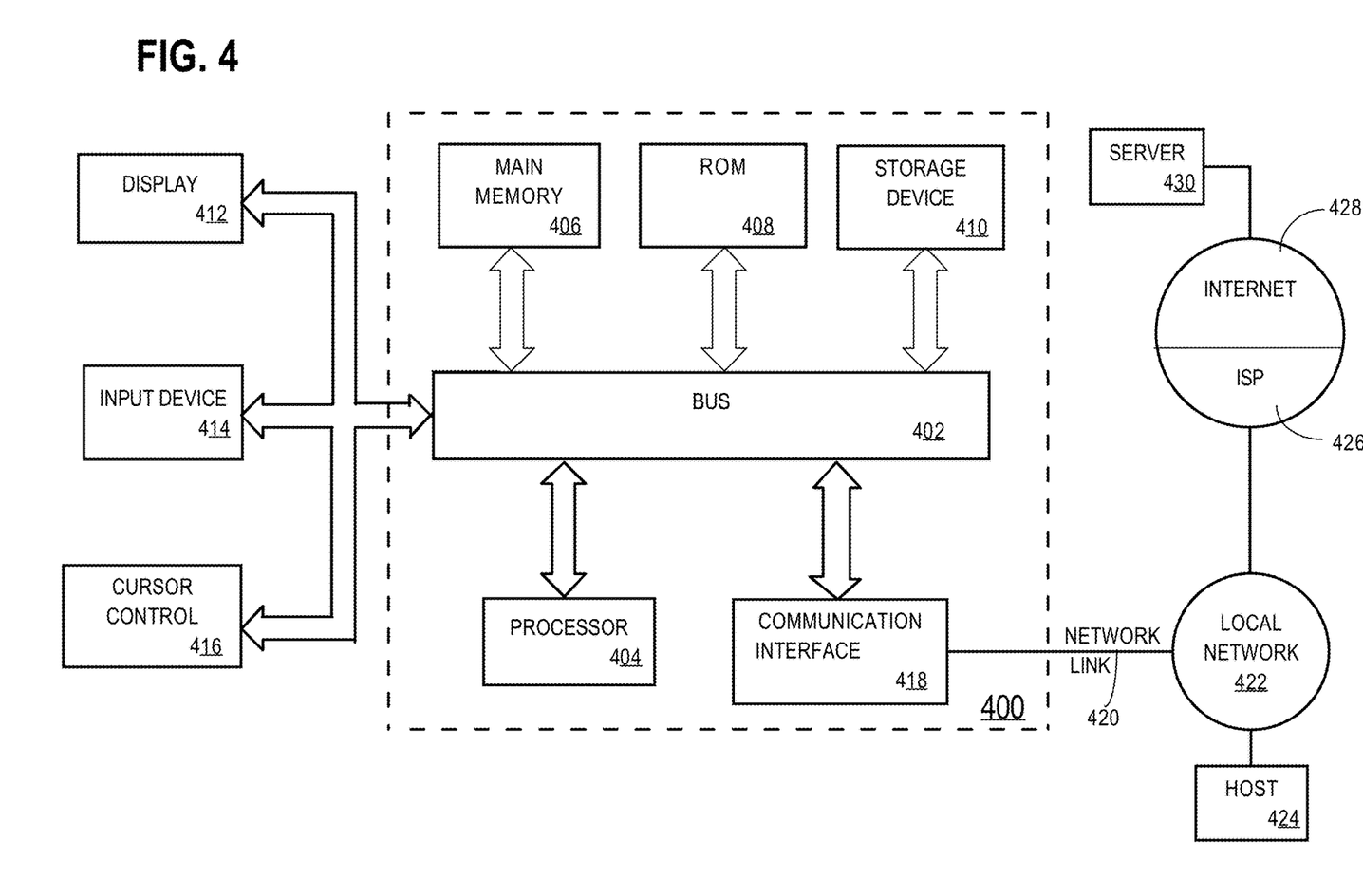
FIG. 4 is a block diagram of a computer system upon which the techniques described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving at a server, over a network, first sharing criteria for a first set of one or more files;
    wherein the first sharing criteria includes first recipient-location criteria and timing criteria;
    wherein the first recipient-location criteria explicitly specifies a plurality of distinct target locations;
    wherein the timing criteria specifies one or more time periods to download the first set of one or more files;
    receiving, at the server, over the network, a request from a recipient device;
    in response to receiving the request, the server determining whether recipient metadata associated with the recipient device satisfies at least a portion of the first sharing criteria;
    wherein the recipient metadata associated with the recipient device includes current-location data that indicates a current location of the recipient device and current-time data that indicates the current time period of the recipient device;
    wherein determining whether recipient metadata associated with the recipient device satisfies at least a portion of the first sharing criteria includes:

determining whether the current-location data corresponds to any one of the plurality of distinct target locations explicitly specified in the first recipient-location criteria; and determining whether the request is received during a time period that satisfies the timing criteria;

responsive to the server determining the recipient metadata associated with the recipient device satisfies the first sharing criteria, the server sharing at least one file of the first set of one or more files with the recipient device; and responsive to the server determining the recipient metadata associated with the recipient device does not satisfy the first sharing criteria, the server not sharing the at least one file of the first set of one or more files with the recipient device, wherein:

the first set of one or more files is a series of location-and-time restricted files;

each file in the series of location-and-time restricted files is associated with a respective target location that a particular person is supposed to visit in a particular time period; and the method further comprises:

storing tracking criteria that indicates which locations the user downloads from;

storing tracking criteria that indicates a time period during which the user downloads;

based on the tracking criteria, determining whether the particular person visited each respective target location during a proper time based on whether the particular person accessed each respective location-restricted file;

in response to determining the particular person did not visit each respective target location at a proper time based on the tracking criteria, creating an indication that the tracking criteria was not fulfilled.

2. A method comprising:

receiving, at a recipient device, user input that specifies a recipient-selected location;

wherein the recipient-selected location is a location that is different than a location of the recipient device;

receiving at a server, from a source device that is different than the recipient device, over a network, first sharing criteria for a first file;

wherein the first sharing criteria specifies a first target location and a target radius;

wherein the first target location is distinct from the recipient-selected location;

receiving, at the server, over the network, a request from the recipient device;

in response to receiving the request, the server determining whether recipient metadata associated with the recipient device satisfies the first sharing criteria;

wherein the recipient metadata associated with the recipient device includes the recipient-selected location;

wherein determining whether recipient metadata associated with the recipient device satisfies the first sharing criteria includes determining whether the [[ ]]recipient-selected location is within the target radius of the first target location;

responsive to the server determining the recipient metadata associated with the recipient device satisfies the first sharing criteria, the server sharing the first file with the recipient device; and responsive to the server determining the recipient metadata associated with the recipient device does not satisfy the first sharing criteria, the server not sharing the first file with the recipient device.

3. The method of claim 2 further comprising the server receiving the recipient metadata from the recipient device over the network.

4. The method of claim 2 wherein:

the first sharing criteria specifies a file password;

wherein the recipient metadata associated with the recipient device includes a recipient password; and determining whether recipient metadata associated with the recipient device satisfies the first sharing criteria includes determining whether the file password matches the recipient password.

5. The method of claim 2 wherein:

the first sharing criteria specifies security criteria;

wherein the recipient metadata associated with the recipient device includes a security profile; and determining whether recipient metadata associated with the recipient device satisfies the first sharing criteria includes determining whether the security criteria is fulfilled by the security profile.

6. The method of claim 2 wherein:

the recipient metadata associated with the recipient device includes access criteria level; and determining whether recipient metadata associated with the recipient device satisfies the first sharing criteria includes granting a level of access rights to the recipient device consistent with the access criteria level.

7. The method of claim 2 wherein:

the first target location is a particular location; and the first file contains information about the particular location.

8. The method of claim 2 wherein the first recipient-location criteria further specifies the first target location and the target radius based on a pre-established policy associated with the first file.

9. The method of claim 2 wherein:

the first sharing criteria further includes one or more file tags assigned to the first file; and responsive to the server determining the recipient metadata associated with the recipient device satisfies the first sharing criteria, the server sharing the first file with the recipient device further based on whether the one or more file tags satisfy a filtering criteria at the recipient device.

10. The method of claim 2 wherein the first target location is the location of the source device.

11. One or more non-transitory storage media storing instructions which, when executed by one or more computing devices, cause performance of:

receiving at a server, over a network, first sharing criteria for a first set of one or more files;

wherein the first sharing criteria includes first recipient-location criteria and timing criteria;

wherein the first recipient-location criteria explicitly specifies a plurality of distinct target locations;

wherein the timing criteria specifies one or more time periods to download the first set of one or more files;

receiving, at the server, over the network, a request from a recipient device;

in response to receiving the request, the server determining whether recipient metadata associated with the recipient device satisfies at least a portion of the first sharing criteria;

wherein the recipient metadata associated with the recipient device includes current-location data that indicates a current location of the recipient device and current-time data that indicates the current time period of the recipient device;
wherein determining whether recipient metadata associated with the recipient device satisfies at least a portion of the first sharing criteria includes:
   determining whether the current-location data corresponds to any one of the plurality of distinct target locations explicitly specified in the first recipient-location criteria; and
   determining whether the request is received during a time period that satisfies the timing criteria;
responsive to the server determining the recipient metadata associated with the recipient device satisfies the first sharing criteria, the server sharing at least one file of the first set of one or more files with the recipient device; and
responsive to the server determining the recipient metadata associated with the recipient device does not satisfy the first sharing criteria, the server not sharing the at least one file of the first set of one or more files with the recipient device, wherein:
   the first set of one or more files is a series of location-and-time restricted files;
   each file in the series of location-and-time restricted files is associated with a respective target location that a particular person is supposed to visit in a particular time period; and
   the method further comprises:
      storing tracking criteria that indicates which locations the user downloads from;
      storing tracking criteria that indicates a time period during which the user downloads;
      based on the tracking criteria, determining whether the particular person visited each respective target location during a proper time based on whether the particular person accessed each respective location-restricted file;
      in response to determining the particular person did not visit each respective target location at a proper time based on the tracking criteria, creating an indication that the tracking criteria not fulfilled.

12. One or more non-transitory storage media storing instructions which, when executed by one or more computing devices, cause performance of:
   receiving, at a recipient device, user input that specifies a recipient-selected location;
   wherein the recipient-selected location is a location that is different than a location of the recipient device;
   receiving at a server, from a source device that is different than the recipient device, over a network, first sharing criteria for a first file;
   wherein the first sharing criteria specifies a first target location and a target radius;
   wherein the first target location is distinct from the recipient-selected location;
   receiving, at the server, over the network, a request from the recipient device;
   in response to receiving the request, the server determining whether recipient metadata associated with the recipient device satisfies the first sharing criteria;
   wherein the recipient metadata associated with the recipient device includes the recipient-selected location;
   wherein determining whether recipient metadata associated with the recipient device satisfies the first sharing criteria includes determining whether the recipient-selected location is within the target radius of the first target location;
   responsive to the server determining the recipient metadata associated with the recipient device satisfies the first sharing criteria, the server sharing the first file with the recipient device; and
   responsive to the server determining the recipient metadata associated with the recipient device does not satisfy the first sharing criteria, the server not sharing the first file with the recipient device.

13. The one or more non-transitory storage media of claim 12, further comprising instructions which, when executed by one or more computing devices, cause performance of the server receiving the recipient metadata from the recipient device over the network.

14. The one or more non-transitory storage media of claim 12 wherein:
   the first sharing criteria specifies a file password;
   wherein the recipient metadata associated with the recipient device includes
   a recipient password; and
   determining whether recipient metadata associated with the recipient device satisfies the first sharing criteria includes determining whether the file password matches the recipient password.

15. The one or more non-transitory storage media of claim 12 wherein:
   the first sharing criteria specifies security criteria;
   wherein the recipient metadata associated with the recipient device includes a security profile; and
   determining whether recipient metadata associated with the recipient device satisfies the first sharing criteria includes determining whether the security criteria is fulfilled by the security profile.

16. The one or more non-transitory storage media of claim 12 wherein:
   the recipient metadata associated with the recipient device includes access criteria level; and
   determining whether recipient metadata associated with the recipient device satisfies the first sharing criteria includes granting a level of access rights to the recipient device consistent with the access criteria level.

17. The one or more non-transitory storage media of claim 12 wherein:
   the first target location is a particular location; and
   the first file contains information about the particular location.

18. The one or more non-transitory storage media of claim 12 wherein the first recipient-location criteria further specifies the first target location and the target radius based on a pre-established policy associated with the first file.

19. The one or more non-transitory storage media of claim 12 wherein:
   the first sharing criteria further includes one or more file tags assigned to the first file; and
   responsive to the server determining the recipient metadata associated with the recipient device satisfies the first sharing criteria, the server sharing the first file with the recipient device further based on whether the one or more file tags satisfy a filtering criteria at the recipient device.

20. The one or more non-transitory storage media of claim 12 wherein the first target location is the location of the source device.

* * * * *